Jan. 14, 1969 KENJI HIRUMA 3,421,407

PORRO PRISM VIEWFINDER COMBINED WITH AN EXPOSURE METER

Filed Dec. 8, 1964

United States Patent Office 3,421,407
Patented Jan. 14, 1969

3,421,407
PORRO PRISM VIEWFINDER COMBINED WITH AN EXPOSURE METER
Kenji Hiruma, Tokyo, Japan, assignor to Kabushiki Kaisha Ricoh, Tokyo, Japan, a corporation of Japan
Filed Dec. 8, 1964, Ser. No. 416,699
Claims priority, application Japan, Dec. 18, 1963, 38/94,730
U.S. Cl. 88—1.5                         1 Claim
Int. Cl. G03b *13/02;* G01j *1/00;* G03b *19/00*

ABSTRACT OF THE DISCLOSURE

A real image type viewfinder and exposure meter in which the latter is mounted in lateral juxtaposition of a Porro prism of the viewfinder, a movable pointer of the exposure meter intersecting an axis of a path of light impinging upon a light-transmitting surface of the prism at right angles thereto at such a point which is at an optical distance from an ocular lens which is the same as the optical distance between the ocular lens and a field mask between the prism and the objective lens.

---

This invention relates to viewfinders for photographic cameras and particularly those of the real image type employing a Porro prism and the invention is intended to enable the photographer to observe the movable pointer of an exposure meter built in the camera simultaneously with the image of the subject being photographed.

Generally, with so-called real image finders, in which a real image of the subject is formed in the finder system, a field mask is placed in the focal plane of the objective lens to define the profile of the visual field and is clearly observable together with the image of the subject. It is apparent, therefore, that if the pointer of the exposure meter or a colored transparent plate secured to the pointer is arranged in the position of the field mask, the pointer or the colored plate secured thereto would also be clearly observable together with the image of the subject being photographed. However, it is extremely difficult to arrange the movable pointer of the built-in exposure meter in the position of the field mask because of the limited space resulting from the finder construction.

In view of this, the present invention proposes to facilitate the incorporation of an exposure meter in a camera casing equipped with a real-image viewfinder by arranging the exposure meter in an appropriate portion of the camera casing to enable the movable pointer of the exposure meter to swing in a lateral position spaced from the ocular of the finder optical system by the same optical distance as the field mask instead of placing the movable pointer of the exposure meter directly in the position of the field mask.

Figure 1:
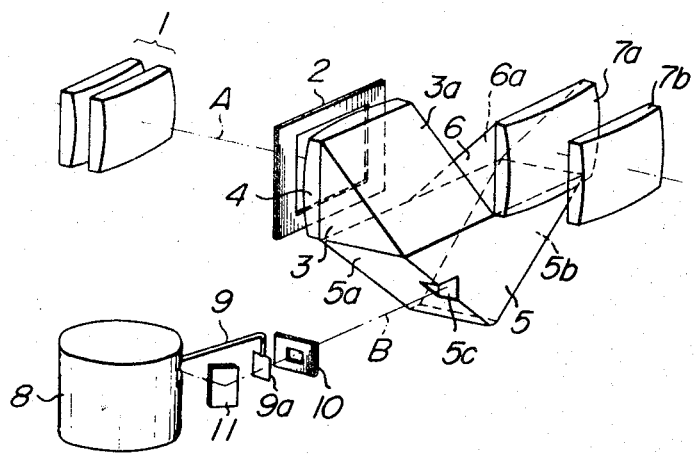
Figure 2:
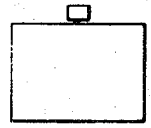

The above and other objects, features and advantages of the present invention will become apparent from the following description when taken in conjunction with the accompanying drawings, in which:

FIG. 1 is a schematic diagram illustrating the essential construction of the viewfinder embodying the present invention; and FIG. 2 is a diagram illustrating the visual field obtainable through the viewfinder.

Referring to the accompanying drawing, reference character A indicates the optical axis of the viewfinder which is parallel to that of the taking lens (not shown). The viewfinder system includes an objective lens 1 on said optical axis A and a field mask 2 arranged in the focal plane of the lens. Arranged immediately behind the field mask is a right triangular prism 3 having a reflecting surface 3a for redirecting the optical axis A downwardly with a condenser lens 4 bonded to that surface of the prism which faces the objective lens 1. A right-prism 5 has reflecting surfaces 5a and 5b extending at right angles to each other and an oblique side one half portion of which is bonded to the bottom side of the triangular prism 3. Bonded to the other half portion of the oblique side of the right-angled prism 5 is the bottom side of another right-angle prism 6 which has an oblique reflecting surface 6a extending at right angles to the reflecting surface 3a of the right triangular prism 3. Reference numerals 7a and 7b indicate a pair of ocular lenses, 7a being bonded to the vertical surface of the right-angle prism 6. With this finder system including a Porro prism having four reflecting surfaces 3a, 5a, 5b and 6a, the inverted image of the subject focused in the plane of the field mask by the objective lens is converted by the Porro prism into an erect image which can be observed through the ocular lenses as an enlarged image of the subject.

Meanwhile, as shown, a small notch 5c is formed in one edge of the reflecting surface 5a of the Porro prism to define a vertical light-transmitting surface. Reference character B indicates the axis of a path of light impinging upon the light-transmitting surface at right angles thereto. An exposure meter 8 includes a movable pointer 9 having a depending end to which an appropriate colored transparent plate 9a is secured and such exposure meter is incorporated in the camera casing on its upper ledge portion in a manner so that the colored plate 9a is movable across the optical axis B at a point spaced from the ocular 7a–7b by the same optical distance as the field mask is spaced from ocular 7a–7b. On the prism side of the colored plate 9a is a mask 10 having a small aperture for restricting the light beam impinging upon the Porro prism while on the opposite side of the colored plate 9a is provided a reflecting mirror 11 for redirecting to the Porro prism the light rays which enter the camera casing through a light aperture (not shown) formed in its ornamental panel.

With the construction described above, the colored transparent plate 9a, secured integrally to the movable pointer of the exposure meter, is preferably designed to be positioned on the optical axis B when the subject to be photographed has a brightness inappropriate to give a proper exposure to the film loaded in the camera as directed to the subject or, for example, when the subject is so dark that the movable pointer of the exposure meter is not fully shifted from its zero position. By this arrangement, the colored transparent plate can be seen through a small window properly formed above the field mask, as shown in FIG. 2, informing the photographer of a situation inappropriate for picture taking. Alternatively, the colored transparent plate may be omitted from the movable pointer of the exposure meter and a small reference lug or notch formed in the top or bottom edge of the aperture in the mask 10. In this case, the end of the pointer of the exposure meter should be positioned in coincidence with the said lug or notch in the mask. To this end, preferably the exposure meter itself is mounted for rotation in mechanical association with a suitable light quantity adjuster element, for example, the shutter speed regulator ring. In this manner, a photographic camera is obtainable which is operable in association with the exposure meter by aligning the pointer thereof with the reference lug or notch formed in the field mask. Also, the small notch 5c in the Porro prism may be formed in any of its reflecting surfaces in accordance with the position in which the exposure meter is mounted. In addition, such notch may apparently be replaced by any appropriate transparent angular protuberance formed on the prism. Thus, for example, a small right angle prism may be employed to serve the purpose with its oblique side suitably bonded to the Porro prism shown in FIG. 1.

According to the present invention, it will be apparent from the foregoing description that in a photographic camera having a built-in real-image type viewfinder an exposure meter can be arranged in juxtaposition to the Porro prism longitudinally of the camera casing and particularly the designing of miniaturized cameras can be markedly facilitated by embodying the present invention therein.

Although one preferred embodiment of the present invention and a few modifications thereof have been illustrated and described, it will be apparent to those skilled in the art that various changes and alterations may be made therein without departing from the spirit of the invention from the scope of the appended claim.

What is claimed is:

1. A real image viewfinder for a photographic camera with a built-in exposure meter comprising an objective lens, a Porro prism positioned on the axis of said objective lens and having four reflecting surfaces and a light-transmitting surface in the form of a notch in one of said four reflecting surfaces in such a position that light entering said light-transmitting surface will be directed by the Porro prism to the ocular, a field mask positioned between said objective lens and said prism, an ocular lens system on that side of said Porro prism opposite said field mask, an exposure meter including a pointer which is movable across an axis of a path of light impinging upon said light-transmitting surface at right angles thereto, and a mask on the latter axis between the path of movement of the pointer and said light-transmitting surface, said movable pointer being offset from the optical axis of said viewfinder by a distance such that the optical distance from the ocular lens system to the point where the movable pointer intersects said axis of the path of light is equal to the optical distance between the field mask and said ocular lens system.

References Cited

UNITED STATES PATENTS

| | | | |
|---|---|---|---|
| 1,687,030 | 10/1928 | Mitchell | 88—1.5 |
| 2,933,991 | 4/1960 | Sauer | 95—42 XR |
| 3,216,309 | 11/1965 | Hartmeister | 88—2.4 |
| 3,250,195 | 5/1966 | Maitani | 95—42 |

JEWELL H. PEDERSEN, *Primary Examiner.*

O. B. CHEW II, *Assistant Examiner.*

U.S. Cl. X.R.

95—10, 11